US006078963A

United States Patent [19]
Civanlar et al.

[11] Patent Number: 6,078,963
[45] Date of Patent: Jun. 20, 2000

[54] ROUTER WITH DE-CENTRALIZED PROCESSING USING INTELLIGENT PORTS

[75] Inventors: Seyhan Civanlar, Middletown Township, Monmouth County; Vikram R. Saksena, Freehold, both of N.J.

[73] Assignee: AT&T Corp., New York, N.Y.

[21] Appl. No.: 09/008,493

[22] Filed: Jan. 16, 1998

[51] Int. Cl.$^7$ .................................................. G06F 13/00
[52] U.S. Cl. ............................................................ 709/238
[58] Field of Search .................... 364/DIG. 1, DIG. 2; 714/4, 3, 5; 709/200, 201, 206, 207, 217, 218, 238, 239

[56] References Cited

U.S. PATENT DOCUMENTS 5,781,715  7/1998  Sheu .............................................. 714/4

OTHER PUBLICATIONS

Collins, Graham P. Exhaustive Searching is Less Tiring With A Bit of Quantum Magic, *Physics Today*, Oct. 1997, pp. 19–21.

Saville, Kirk. What's A Quantum Phone Book? *Bell Labs News*, Oct. 1997, pp. 1 and 3.

*Primary Examiner*—Robert B. Harrell

[57] ABSTRACT

An improved network router having a plurality of intelligent router ports. Each intelligent router port may have its own routing and/or forwarding engines. Thus, a centralized master routing and forwarding engine, existing in conventional routers, is not necessary. Accordingly, the bottlenecking problems associated with a centralized routing and forwarding engine are significantly reduced.

12 Claims, 3 Drawing Sheets

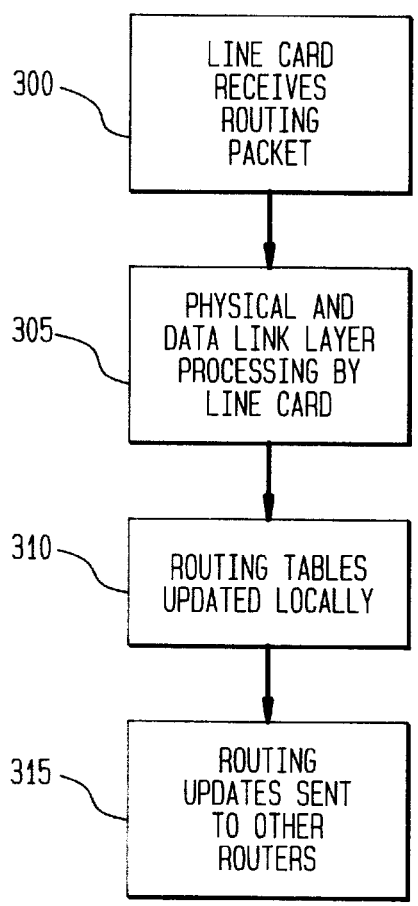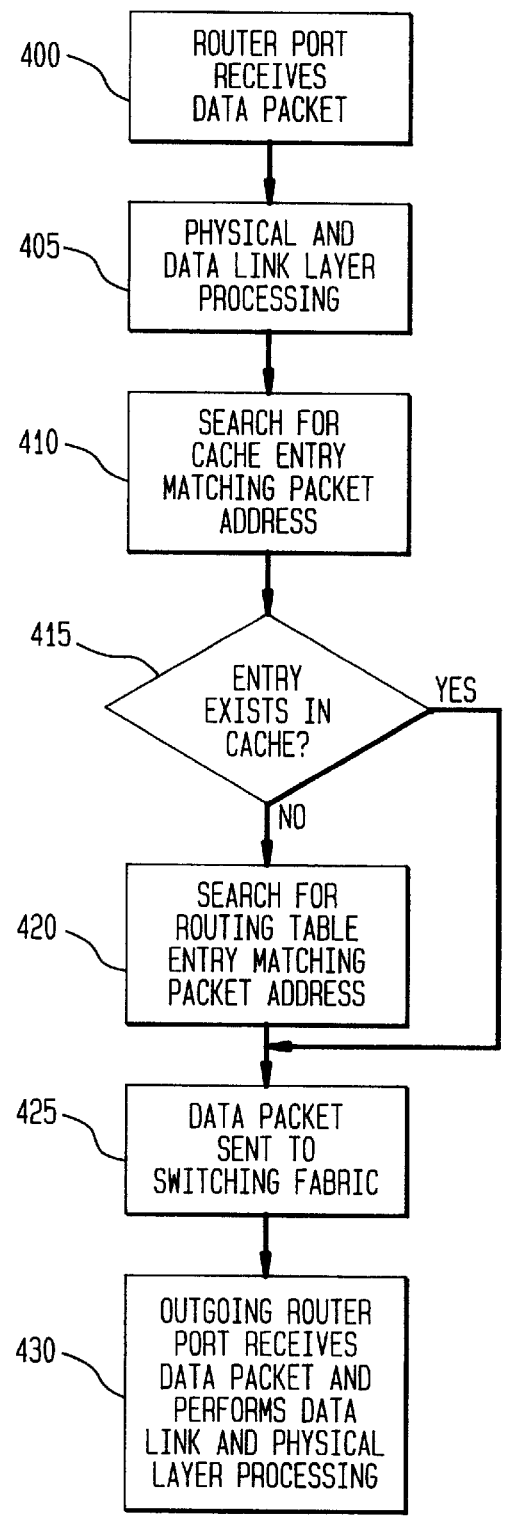

ROUTER WITH DE-CENTRALIZED PROCESSING USING INTELLIGENT PORTS

FIELD OF THE INVENTION

The present invention is directed generally to routers, and more specifically to new architectures and methods for routing data in a network.

BACKGROUND

Continued growth of various networks (e.g., the Internet) and new network applications (e.g., multimedia) have been creating a demand for higher bandwidth capabilities of network service providers. One way to increase network bandwidth is to provide for higher forwarding and/or routing performance within the network.

A conventional router typically performs network layer (i.e., Layer 3 of the Open System Interconnection model) processing of data packets (e.g., Internet protocol (IP) data packets) using a single centralized routing/forwarding processor for routing and forwarding data packets. The centralized routing/forwarding processor is typically connected with a plurality of ports for receiving and transmitting the data packets. The centralized routing/forwarding processor computes and stores a master routing table using information contained in intercepted routing protocol packets. Using the master routing table, the routing/forwarding processor controls the actual switching of the data packets between each of the line cards. Thus, in conventional routers, network layer processing for all of the ports is performed by a single centralized routing/forwarding processor.

A problem with centralizing the forwarding and routing of data packets is that a bottleneck may be created. Existing architectures can typically handle a maximum load of only a few hundred thousand data packets per second. Modifications to the basic conventional architecture for increasing router performance are known, such as by using route-caching, gigabit routing, short-cut routing, or IP switching. However, many of these methods are expensive to implement, do not allow convenient expansion of router capacity (e.g., as the network expands), and/or have other significant limitations that make such methods problematic or impractical. Thus, in order to increase the performance of routers, significant changes to the conventional architectures and routing methods are required.

SUMMARY OF THE INVENTION

The present invention solves at least some or all of the above-mentioned problems with conventional router architectures.

In one aspect of the invention, some or all of the ports in a router independently perform routing and forwarding functions. Since processing is distributed among the router ports, bottlenecking problems of conventional routers are avoided. Some or all of the router ports may include their own routing engine, forwarding engine, and/or routing tables. Thus, there is no need for a centralized routing engine, forwarding engine, and/or routing table.

In a further aspect of the invention, a router port according to the present invention may utilize unsorted routing tables due to a decreased processing burden upon the routing and forwarding engines.

In still further aspects of the invention, a router may use a improved processing algorithm such as the Grover algorithm.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in router theory and design, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 3 is a flow chart showing steps in an exemplary routing algorithm that may be used by a line card consistent with the architecture of FIG. 1.

FIG. 4 is a flow chart showing steps in an exemplary forwarding algorithm that may be used by a line card consistent with the architecture of FIG. 1.

DETAILED DESCRIPTIONS OF PREFERRED EMBODIMENTS

Figure 1:
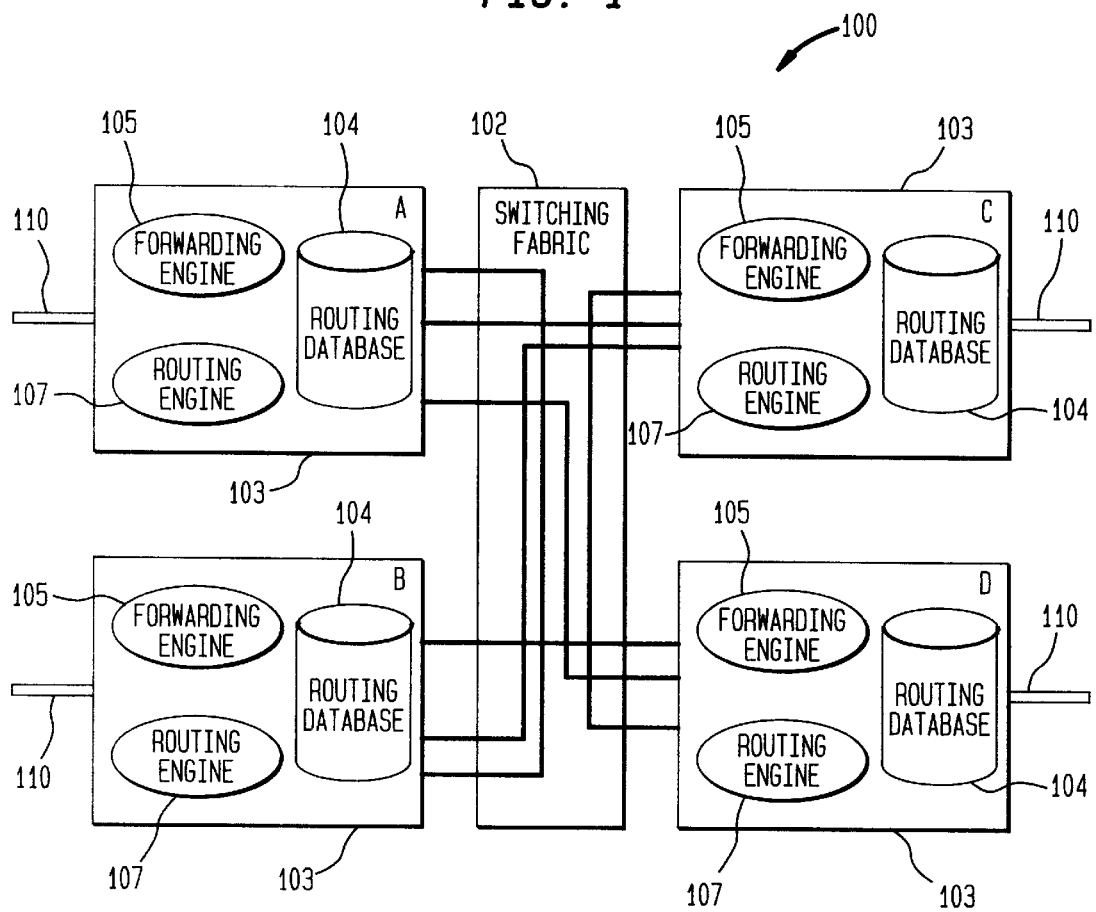
FIG. 1 illustrates an exemplary embodiment of a router according to aspects of the present invention.

Referring to FIG. 1, an embodiment of a router 100 according to one aspect of the present invention may have a switching fabric 102 coupled with a plurality of intelligent router ports 103. In some embodiments, the intelligent router ports are individual electronic circuit cards such as line cards. Although the embodiment shown in FIG. 1 has individual electronic circuit cards, it will be apparent to those skilled in the art that certain methods and techniques described herein are applicable to other embodiments where some or all of the intelligent router ports 103 may be integrated into a single circuit board or embodied in any other form or layout such as a ceramic and/or wafer scale integrated module. Some or all of the intelligent router ports 103 may be coupled to external network nodes such as other routers/switches in an overall network (not shown).

The intelligent router ports may be variously configured to include a forwarding engine 105, a routing engine 107, and/or a routing database 104. In exemplary embodiments, the intelligent router ports 103 are removable line cards such that additional intelligent router ports may be added to increase the capacity of the router 100. In some embodiments, each intelligent router port 103 may have its own identification. Thus, for example, the four intelligent router ports 103 shown in FIG. 1 may be arbitrarily identified as A, B, C, and D for purposes of identification. However, any method of addressing or other known designation system or method may be used to identify the various intelligent router ports 103. Furthermore, the router 100 may have any number of intelligent router ports 103, limited only by the complexity and/or bandwidth of the switching fabric 102.

The switching fabric 102 may switch between and/or otherwise partially or fully interconnect some or all of the intelligent router ports 103. The switching fabric 102 preferably transfers data at a very high speed. In the simplest form, the switching fabric may simply be a bus interconnecting all of the line cards. In more advanced embodiments, the switching fabric 102 may include one or more multiplexors and/or demultiplexors. In still further embodiments, the switching fabric 102 may be a reconfigurable partial and/or full mesh of direct or indirect connections between various intelligent router ports 103 and/or a network of switches (including conventional crossbar switches). For each of these embodiments, it is preferable that the switching fabric 102 normally operate using a distributed control to maintain a very high speed. Accordingly, embodiments of the present invention do not require the switching fabric 102 nor the router 100 itself to have a central processor as is required in conventional routers. Instead, as will be discussed in more detail below, each intelligent router port 103 may operate autonomously and may be capable of generating and maintaining its own routing tables and/or forwarding data packets in accordance with the routing tables, without the need for a central processor coordinating this activity.

The routing engine 107 in the intelligent router port 103 may maintain and process routing data from the routing data base 104 for use by the forwarding engine 105. Each intelligent router port 103 may be configured to independently generate its own routing tables without the need for a central routing engine and/or a master routing table. In some embodiments, information necessary for generating and/or updating routing tables may be contained in routing protocol packets received by the intelligent router port 103 from the network interface. Any known types of routing protocols packets may be received by the routing engine 107, such as those conforming to the routing Internet protocol (RIP), the open shortest path forwarding (OSPF) protocol, or the border gateway protocol 4 (BGP4). In embodiments where the routing table is independently generated, each forwarding engine 105 may be configured to forward new routing table configuration data received on one or more of the network interfaces 110 to every other intelligent router port 103 for updating each of the routing databases 104. In further embodiments, the intelligent router ports 103 may update their own routing tables according to the contents of incoming routing protocol packets. In still further embodiments, the intelligent router ports 103 may update other routers (not shown) interconnected with the router 100 using, for example, RIP, OSPF, and/or BGP4.

The routing database 104 may be configured to store the routing tables and/or other data for use by the forwarding engine 105 and the routing engine 107. A routing table may contain information for switching data packets originating from one intelligent router port 103 to another intelligent router port. Routing tables and/or other similar data may relate one or more addresses (e.g. Internet protocol (IP) packet addresses contained in IP headers) received on a network interface 110 with one or more outgoing intelligent router ports 103 interconnected via the switching fabric 102. For example, the routing table may indicate that all data packets having a particular IP address should be output on the switching fabric 102 to intelligent router port A.

The forwarding engine 105 may process received data packets (e.g., Open System Interconnection (OSI) model Layer 3 data packets such as IP packets) and/or forward the data packets to appropriate other intelligent router ports 103 via the switching fabric 102. Specifically, the forwarding engine 105 may compare an address of a data packet with the routing table to determine the location the intelligent router port 103 to which the data packet should be forwarded.

Each intelligent router port 103 individually may perform some or all of the functions of a conventional router port as well as some or all of the functions of the centralized routing and forwarding engines of a conventional router. In other words, an intelligent router port 103 may maintain its own routing tables and autonomously perform physical (OSI Layer 1), data-link (OSI Layer 2), and/or network (OSI Layer 3) layer processing on data packets and/or routing protocol packets. Thus, a router 100 according to one aspect of the present invention is significantly more scalable than a conventional router since there is no central processor controlling the routing functions. The capacity of a router according to the present invention may be easily increased simply by adding new intelligent router ports 103. Thus, the capacity of a router according to one aspect of the present invention is only limited by the capacity of the switching fabric 102. Since the switching fabric 102 does not need to include a processor, it may be extremely fast and thus may not be a source of bottlenecking. Further, the switching fabric may be implemented using high speed multiplexers/demultiplexers and thus be extremely fast and reliable.

Figure 2:
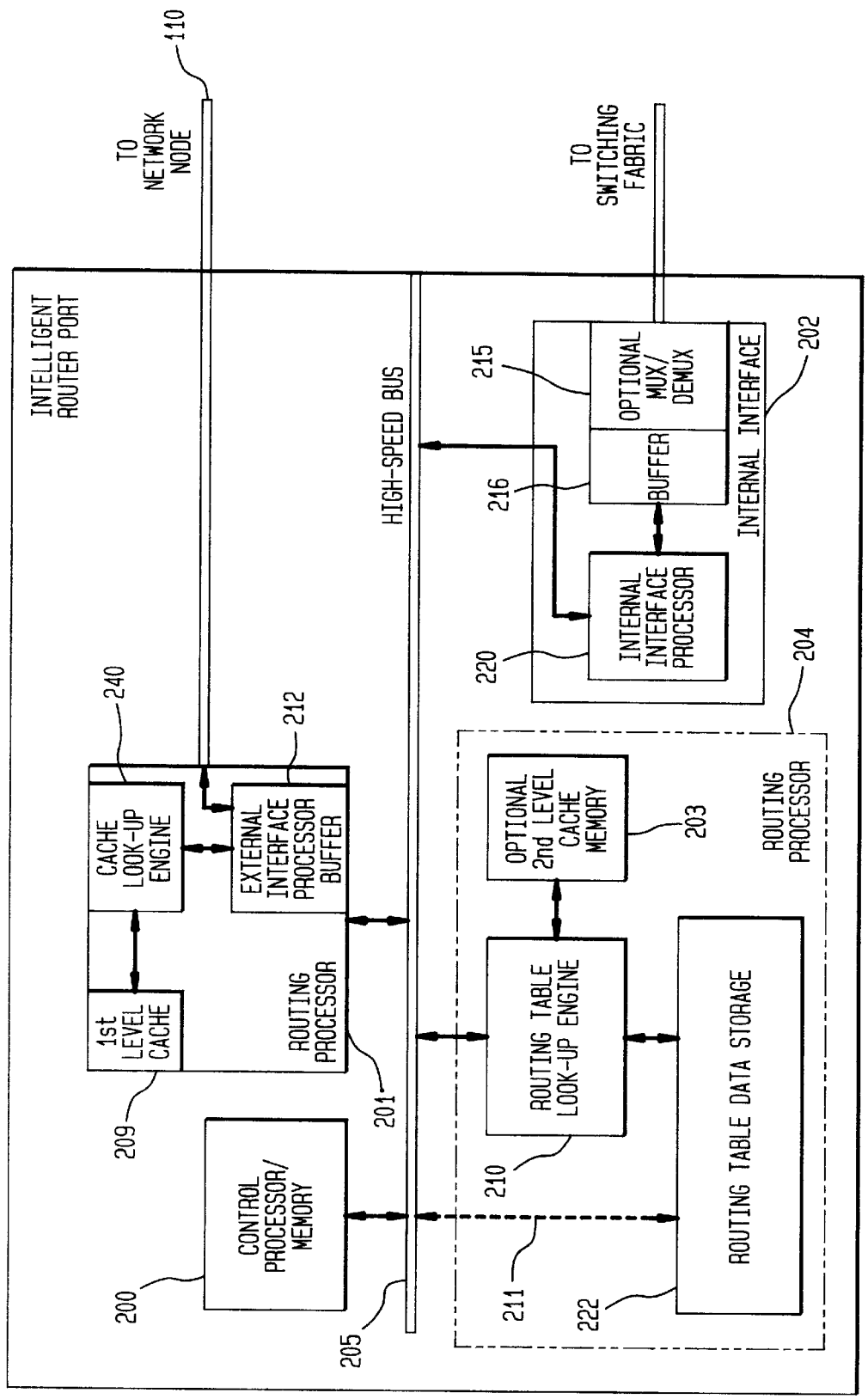
FIG. 2 is a block diagram of an exemplary embodiment of a line card consistent with the architecture of the router of FIG. 1.

Referring to FIG. 2, an intelligent router port 103 may include a control processor/memory 200, an external interface 201 having one or more connections with another network node such as a neighboring router via network interface 110, an internal interface 202 having one or more connections with the switching fabric 102, and a routing processor 203. The external interface may be variously configured to include a first level cache 209, a cache look-up engine 240, and/or an external interface processor/buffer 212. The internal interface may include an optional multiplexer/demultiplexer 215, a buffer 216 and an internal interface processor 220. The routing processor 204 may include a routing table look-up engine 210, optional second level cache memory 203, and routing processor 204. Some or all of the elements in the intelligent router port 103 may be interconnected via a bus 205 (e.g., a high-speed bus) and/or interconnected in any other manner such as direct connection among each other via one or more dedicated paths and/or multiplexers. Furthermore, some or all of these elements may The physically and/or functionally integrated with each other such as in an integrated circuit. For example, the cache look-up engine, first level cache and external interface/buffer may be disposed on a single integrated circuit; the routing table look-up engine may be disposed on a second integrated circuit; the internal interface processor 220, buffer 216, and/or optional multiplexer/demultiplexer 215 may be disposed on a third integrated circuit; and the control processor/memory 200 may be disposed on a fourth integrated circuit using a custom configuration and/or a standard configuration such as an Intel 8960 microcontroller.

FIG. 2 is one exemplary embodiment of the intelligent routing ports shown in FIG. 1. The processing for performing the function of the forwarding engine 105 of FIG. 1 may be divided between the external interface 201 and the internal interface 202 of the embodiment of the intelligent router shown in FIG. 2. The processing for performing the function of the routing engine 107 of FIG. 1 may be divided between the cache look-up engine, routing table look-up engine, and/or control processor/memory. The function of the routing database of FIG. 1 may be performed by the routing table data storage 204, the optional second level cache memory 203, and/or the first level cache 209.

The routing table look-up engine 210 and/or cache look-up engine 240 may be variously configured. In its simplest form, the routing table look-up engine 210 and/or cache look-up engine 240 is simply a general purpose processor such as an Intel Pentium Processor and/or RISC based microcontroller such as an 8960. If a processor is utilized, various database look-up techniques may be applied to collating IP addresses with routing table entries to determine an appropriate intelligent router port to which to output data packets via the switching fabric 102. In one exemplary embodiment of the present invention, the routing table look-up engine 210 and/or cache look-up engine 240 is a processor configured to execute a quantum search algorithm such as the Grover Algorithm described in L. K. Grover, Phys. Rev. Lett. 79, 325 (1977); Kirk Saville, What's A Quantum Phone Book?, *Bell Labs News,* October 1997, pp. 1 and 3; and Graham P. Collins, Exhaustive Searching is Less Tiring With a Bit of Quantum Magic, *Physics Today,* October 1997, pp. 19–21). Although Quantum search algorithms may be performed using binary computers, the algorithms are vastly superior using quantum logic and hence quantum logic may be substituted for some or all of the routing table look-up engine 210 and/or cache look-up engine 240. In the current state of the art, quantum logic is limited to a relatively small number of working gates. Accordingly, it may be desirable to utilize the quantum logic to construct some or all of the cache look-up engine 240 and/or first level cache 209. Using present technology, the number of entries in this cache may be quite small. However, as the quantum logic technology matures, larger cache tables could be utilized, and eventually, as the quantum technology reaches maturity, it will be possible to execute a quantum search algorithm (e.g., Grover's Algorithm) in a quantum processor to search an entire routing table data storage 204 using a quantum processor.

As is well known in the art, in quantum logic, the manner in which subatomic particles (e.g., electrons, protons, photons) behave is dictated by the laws of quantum mechanics. According to quantum mechanical theory, each particle may be viewed as having the properties of either a particle or a wave. Viewed as a particles, each particle occupies one of many discrete energy states called quanta. Viewed as a wave, each particle is probabilistically distributed in time and space, and so its location at any given time is determined by probability theory (e.g., electrons are everywhere at once). The actual location of a particle cannot be determined unless and until the particle interacts with other particles. Quantum logic grew out of research done at the IBM T. J. Watson Research Center in the 1960s and 1970s by Rolf Landauer and Charles H. Bennett. Research has continued in this area, and in the 1980's research at the Argonne National Laboratory by Paul Benioff showed that quantum theory could be utilized to perform computations. In 1993, research at Los Alamos national Laboratories by Seth Lloyd showed that many systems could function as quantum computers. Also in 1993, one of our fellow researchers at AT&T Bell Laboratories, Peter W. Shor, proved that a quantum computer could factor large numbers many orders of magnitude faster than a digital computer. These findings have sparked a huge growth of research in quantum computing, and many groups are constructing basic quantum logic gates. Although these research efforts are still relatively immature, there are several implementations which have built working logic gates including groups at the National Institute of Standards and Technology (NIST) a team at CalTech. In operation, the "state space" of quantum logic is much greater than that of a binary computer and thus quantum bits are termed "qubits." For example, although an 8 bit binary register can only one number at a time, an 8 qu-bit register simultaneously holds all 256 possible numbers. As a result, it is possible to perform complex searches quickly as taught by Grover in the above referenced articles.

Although large scale quantum logic presently has some reliability problems in maintaining coherency over many operations without the use of robust quantum error-correcting codes, for cache operations such as in the first level cache 209, the cache may be purged after only a few operations anyway. Thus, the coherency problems normally associated with quantum logic can be minimized in this particular implementation. Further, as the technology matures and these problems are alleviated, quantum logic may be utilized to replace some or all of the routing table look-up engine 210. In 1947, when the transistor was first built by AT&T Bell laboratories, reliability problems also prevented large scale implementation. However, within a few years, the transistor reliably supported small scale logic functions. Eventually, it found expanded applications. In a similar fashion, quantum logic today is still in its infancy and will only support limited cache look-up functions as in the first level cache. However, as the technology matures, quantum logic may also be utilized in the routing table look-up engine 210.

The routing table look-up engine 210 may be configured to be extremely fast at processing searches of unordered and/or unordered routing tables. The routing table look-up engine may comprise numerous registers which may search through the routing table in parallel and/or using an efficient lists of data such as linked lists and/or ordered lists. Since each intelligent router port 103 has a dedicated processor, the routing and forwarding functions may be performed at a much higher speed. For example, searches through unsorted routing tables are an intensive activity which may be and are often impractical in conventional routers. However, since intelligent router port 103 may only process data from an associated network interface, the intelligent router port 103 may be configured to quickly search for addresses even while using unsorted routing tables.

Unsorted routing tables require less processing power by central processor/memory 200 to build and maintain. However, unsorted routing tables require more sophisticated processing by the routing table look-up engine 210 when searching for a destination intelligent router port 103 associated with an incoming address (e.g., an incoming IP address). In embodiments using sorted routing tables, more overhead processing is required to maintain and update the routing table and hence processor/memory 200 may require a direct connection to routing table data storage 204. However, sorted routing tables allow the design of the routing table look-up engine 210 may be simplified.

In exemplary embodiments, the routing table look-up engine 210 may be configured to include a high-speed read/modify/write ability. Using this ability, the routing table may be sorted as it is searched. Thus, each successive search of the routing table may configure similar IP addresses to be contained in a certain area of the routing table data storage 222. In this manner, successive searches can start at an address in the routing table data storage 222 which may be more likely to produce a favorable result.

In operation, where a data packet is received from the network interface 110, the data packet may be stored in the buffer of the external interface processor/buffer 212. Either on a first-in-first out basis and/or on a parallel basis, addresses of the data packets may be examined by the cache look-up engine 210 using data stored in the first level cache 209. The data in the first level cache 209 may be obtained from the control processor/memory 200 and/or the routing table look-up engine 210. In exemplary embodiments, the first level cache is a series of memory locations (e.g., registers) disposed in an integrated circuit comprising the external interface 201. Locating the cache look-up engine 210 in the external interface allows data packets associated with a single transmission to be immediately routed to the internal interface 202, bypassing the routing processor 204 altogether. Although the high-speed bus is shown in making the transfer a separate high speed interconnection between the external interface 201 and the internal interface 202 may also be used. Where the high speed bus is utilized, a high speed bus may be configured to accommodate multiprocessing.

Where the routing information is not contained in the first level cache 209 and/or where the intelligent router port is configured without a first level cache, the incoming data packets may be routed to routing table look-up engine 210. The routing table look-up engine may first examine a second level cache 203 to determine if the requested data has been accessed recently. As with the first level cache, an address may be added to the route cache table each time a search for that address is performed. An address may be removed from either the first or second level cache memory after, for instance, a timer expires without a refreshment entry of that address. The first level cache may have many substantially fewer entries than the second level cache, which may, in turn, have substantially fewer entries than the routing table data storage. Routing and forwarding performance thus may be increased by searching first in the first level cache, then in the second level cache, and finally in the routing table data storage. In exemplary embodiments, items removed from the first level cache may be stored in the second level cache until, for example, a second timer has expired without that address being accessed. The first timer may be disposed in the cache look-up engine 210 and the second timer may be disposed in the routing table look-up engine 210.

Referring to FIG. 3, an intelligent router port 103 may maintain a routing table and/or a route cache table by first receiving a routing protocol packet (step 300) from another network node external to the router 100 via the external interface 201 and/or from another intelligent router port 103 within the router 100 via the internal interface 202. These interfaces 201, 202 may perform physical (OSI Layer 1) and/or data link (OSI Layer 2) layer processing of the routing protocol packet (step 305). The Layer 1 and 2 functions may include, for example, electrical circuit control, data bit transfer, data error detection, and/or data error recovery. After receiving and processing the routing protocol packet, the interfaces 201, 202 may transfer the routing protocol packet to the bus 205. The processor 200 may receive the routing protocol packet via the bus 205 and may update routing tables stored in the first level cache, second level cache, and/or routing table data storage 222 (step 310). The processor 200 may also broadcast a routing update to the other intelligent router ports 103, for instance across the switching fabric 102. The processor 200 may further forward a routing update to neighboring routers in the network using well-known protocols such as RIP, OSPF, and/or BGP4.

Referring to FIG. 4, an intelligent router port 103 (e.g., intelligent router port A) may forward a data packet by first receiving the data packet from another network node such as another router via the external interface 201 (step 400). The external interface 201 may perform Layers 1 and/or 2 processing on the data packet. As discussed above, the search for a routing table entry may be distributed among the cache look-up engine 210 and first level cache 209, the routing table look-up engine 210, and/or the control processor/memory 200 (step 405). Where the entry exists in the first level cache 209, the data packet may be routed directly from the external interface 201 to the internal interface 202 (step 425). Where the entry does not exist in the first level cache, the data packet addressing information may be forwarded to the routing table look-up engine 210 (Step 420) for searching of the second level cache 203 and/or the routing table data storage 222. In exemplary embodiments, the packet may remain in buffer 212 while the header information is processed by either the cache look-up engine 210 and/or the routing table look-up engine 210. Where the packet remains in the buffer, the packet is transferred to the internal interface 202 along with the control information from the routing table necessary to route the packet to the appropriate intelligent router port 103 in the switching fabric. Upon finding a matching address, the routing data may be forwarded directly to the internal interface 202 and/or back to the buffer in the external interface 201 to label the data packet with an identifier to inform the switching fabric via the internal interface 202 of the best outgoing intelligent router port 103. The data packet may be sent to the switching fabric 102 via the internal interface 202 (step 425). A buffer may be disposed in the internal interface 202. The buffer may be logically organized to have different storage areas for each intelligent router port. Where the multiplexers/demultiplexers are disposed in each of the intelligent router ports 103, the switching fabric 102 may simply be a series of interconnected busses. Alternatively, the switching fabric may be configured as discussed above to include any known switching fabric. The switching fabric 102 may then switch the data packet to the best outgoing intelligent router port identified in the data packet.

Upon receipt, the internal interface processor 220 simply pushes all data packets from the switching fabric directly to the external interface processor/buffer 212 for output to the network interface 110. The outgoing intelligent router port 103 may then perform Layer, 1 and/or 2 processing and send the data packet on to the next network node (step 430). It is notable that no Layer 3 processing is necessary at the outgoing intelligent router port 103 and hence processing is very efficient.

The router 100 may be compatible with and may be implemented in conjunction with any other known methods and/or apparatus for improving router performance. For example, the router 100 may implement route-caching, gigabit routing, short-cut routing, and/or IP switching While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A router for use in a network comprising:
   a switching fabric; and
   a plurality of intelligent router ports interconnected via the switching fabric, each of the intelligent router ports including a routing table and a processing unit configured to receive data packets from the network, process the data packets using information in the routing table, forward the data packets via the switching fabric to a selected one of the intelligent router ports responsive to the routing table, and independently generate and maintain a routing table.

2. The router of claim 1 wherein the intelligent router ports are configured to compare an address of at least one of the data packets with the routing table.

3. The router of claim 2 wherein the intelligent router ports each include an external interface for interfacing with the network, the external interface including a first level cache for storing routing information.

4. The router of claim 1 wherein the intelligent router ports each include an internal interface for interfacing with the switching fabric, the internal interface including a multiplexer.

5. The router of claim 1 wherein each of the intelligent router ports includes a cache containing routing information.

6. The intelligent router port of claim 1 wherein the routing table is updated according to contents of a routing protocol packet received by the intelligent router port.

7. An intelligent router port for a router, the intelligent router port having a processor for independently maintaining a routing table and for forwarding a data packet according to the routing table and an address of the data packet.

8. The intelligent router port of claim 7 wherein the routing table is an unsorted routing table.

9. A method of operating a router comprising utilizing a quantum search algorithm to perform a search on an unsorted router table.

10. The method of claim 9 wherein the quantum search algorithm includes the Grover search algorithm.

11. A router comprising quantum search logic for searching an unsorted routing table.

12. The router of claim 11 wherein the routing table is maintained in a cache and the quantum search logic includes a plurality of gates.

* * * * *